United States Patent [19]

Iwata et al.

[11] 4,005,448
[45] Jan. 25, 1977

[54] PROGRAMMED SHUTTER

[75] Inventors: Hiroshi Iwata, Osaka; Katsuji Ishikawa, Daito, both of Japan

[73] Assignee: West Electric Company, Ltd., Osaka, Japan

[22] Filed: Oct. 31, 1974

[21] Appl. No.: 519,653

[30] Foreign Application Priority Data

Nov. 5, 1973 Japan .............................. 48-124806
Dec. 28, 1973 Japan .............................. 49-2837

[52] U.S. Cl. .................................. 354/30; 354/48; 354/60 R; 354/230; 354/234
[51] Int. Cl.² ........................ G03B 7/08; G03B 9/02
[58] Field of Search ............. 354/23 R, 26, 28, 29, 354/30, 48, 50, 51, 60 R, 228, 230, 234

[56] References Cited

UNITED STATES PATENTS

| | | | |
|---|---|---|---|
| 3,680,460 | 8/1972 | Starp | 354/230 |
| 3,695,158 | 10/1972 | Fahlenberg | 354/60 X |
| 3,709,137 | 1/1973 | Starp | 354/60 X |
| 3,813,680 | 5/1974 | Wagensonner et al. | 354/44 |
| 3,882,522 | 5/1975 | Erlichman | 354/30 |

Primary Examiner—Joseph F. Peters, Jr.
Attorney, Agent, or Firm—Cushman, Darby & Cushman

[57] ABSTRACT

This invention relates to a programmed shutter designed to automatically provide suitable exposures to a camera wherein shutter blades serve also as diaphragm blades and a driving mechanism is intermittently actuated by impressed pulse signals. Suitable exposures are obtained by automatic stepwise selection of an appropriate aperture value in response to the objective brightness and then by automatic regulation of the exposure time under the selected aperture value, both being accomplished by an electronic circuit for feeding said pulse signals to actuate said blades.

13 Claims, 18 Drawing Figures

PROGRAMMED SHUTTER

BACKGROUND OF THE INVENTION

This invention relates to a programmed shutter designed to provide suitable exposures by automatically setting, in response to the objective brightness, aperture and exposure time for actuating a driving mechanism for blades which serve both as diaphragm blades and shutter blades.

There have been several prior programmed shutters designed to automatically regulate suitable exposures. A typical one of these is an aperture-preset type programmed shutter which comprises a diaphragm mechanism driven by a driving actuator associated with a moving coil and a separate shutter mechanism. This type is designed to determine first the diaphragm aperture value, as is specified by the diaphragm mechanism, and then the shutter blades are opened under the abovementioned preset aperture value. After performing the exposure, the shutter is closed.

Another representative type of prior art employs common blades for shutter and diaphragm, but they are opened by a conventional governor mechanism, and when, in such opening process, the blades reach the determined aperture value, they immediately are closed.

In the first mentioned example prior art, i.e., the aperture-preset type, the driving actuator is associated with a moving coil of an ammeter. Therefore, its reaction to rapid changes of the object is too slow. For instance, if the object becomes suddenly bright or dark when determining the aperture value, there are possibilities of exposure errors occurring. This type of system has further shortcomings in that the employment of a moving coil limits the strength of the mechanism against impacts, and the dual installation of an intricate diaphragm mechanism on top of the shutter mechanism makes the combination very complicated.

In the second example of prior art cited above, the governor mechanism for controlling the blades has a very intricate and delicate constitution, and hence, in a long period of frequent use, the exposure performance is liable to deteriorate in precision.

SUMMARY OF THE INVENTION

In view of the above-mentioned problems, the present invention is intended to provide a programmed shutter having a simple mechanism strong enough to withstand mechanical impacts and also having an exposure characteristic stable for long and frequent use and capable of providing suitable exposures to match the objective brightness.

Another object of this invention is to enable the shutter to make suitable exposures in spite of fast changes of the objective brightness.

This invention particularly provides the function of common blades driven by a stepping motor which is intermittently actuated by the impression of pulse signals, so as to eliminate the conventional formulas of shutter operation.

BRIEF EXPLANATION OF THE DRAWINGS

FIGS. 2(A),(B) and (C) are schematic illustrations for explaining the operational principle of the stepping motor shown in FIGS. 1(A) and (B), FIGS. 3(A) and (B) are views showing the open and closed states, respectively, of one example of blades for an exposure-control device driven by a stepping motor.

DETAILED DISCLOSURE OF THE INVENTION

Figure 1:
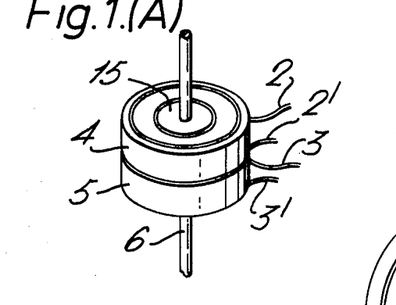
FIG. 1(A) is perspective view of a stepping motor with its casing removed, used as a driving actuator for driving shutter blades which also serve as diaphragm blades of the programmed shutter according to this invention.
FIG. 1(B) is an exploded perspective view of said stepping motor.

The shutter according to this invention includes a known stepping motor, shown in FIG. 1(A), which is used as one of the driving actuators for the programmed shutter.

The stepping motor has a pair of exciting coils 4 and 5 to which lead-in wires 2-2' and 3-3', respectively, are connected, and a shaft 6 of a rotor 15 is installed in the center of the stepping motor.

Figure 2:
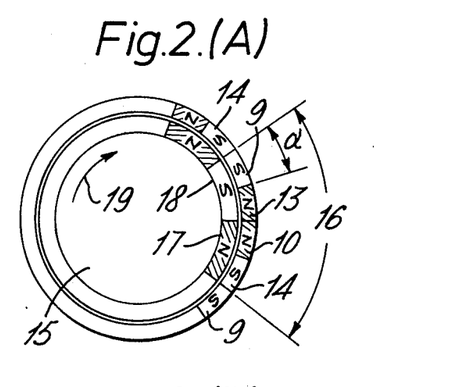

Details of the motor are illustrated in FIG. 1(B). An upper magnetic ring 7 and a lower magnetic ring 8, having the same number of projections 9 and 10, respectively, are combined to form cage-like stator poles, with the projections 9 and 10 arranged alternately to each other. This assembly is inserted within the coil 4. Similarly, an upper magnetic ring 11 and a lower magnetic ring 12, having the same number of projections 13 and 14 as the abovementioned projections 9 and 10, respectively, also are combined to form cagelike stator poles, with the projections 13 and 14 arranged alternately to each other. This additional assembly is inserted within coil 5. As shown in FIG. 2(A), the stators are stacked within coils 4 and 5 in such a manner that the projections of the stator in coil 4 are arranged in spaces between the projections of the stator in coil 5. The cylindrical surface of rotor 15 is magnetized to have vertical S and N poles alternately along its direction of rotation. The number of pairs of N and S poles is designed to be one half (½) of the total number of projections 9, 10, 13, amd 14.

When the coils 4 and 5 are energized by current passing through the lead-wires 2-2' and 3-3', the projections 9, 10, 13 and 14 of the stator are magnetically excited as shown in FIG. 2(A). Accordingly, as represented in angular range 16, an N magnetic pole 17 of the rotor is repelled by the N pole 10 and attracted by the S pole 14 of the stator. Also, an S pole 18 of rotor 15 is repelled by the stator's S pole 9 and attracted by the N pole 13. Therefore, the rotor 15 is actuated to rotate clockwise by one step as shown by the arrow 19 and it stops in the position shown in FIG. 2(B). By reversing the direction of the current in coil 5, the polarity of the poles 13 and 14 are reversed, and the rotor 15 is again actuated to rotate clockwise by one step. Next, by reversing the current direction in the coil 4 as shown in FIG. 2(C) the polarity of the poles 9 and 10 are reversed, and the rotor 15 is further actuated to rotate clockwise by one step. Thus, by alternately applying pulses to the coils 4 and 5, the rotor 15 of the motor is actuated by steps corresponding to the number of pulses. Direction of the rotation is reversed by reversing the order of applying pulse signals to the coils 4 and 5. Generally a known stepping motor 1 contains an electronic circuit for feeding the pulses to two coils 4 and 5 in the desired order for clockwise or counter-clockwise rotations in response to a direction signal.

According to this invention elements are linked to the stepping motor which serve both as diaphragm blades and shutter blades, and therefore, these elements, herein are referred to simply as blades. FIG. 3(A) and 3(B) show one example of the actuation mechanism for such blades.

Figure 3:
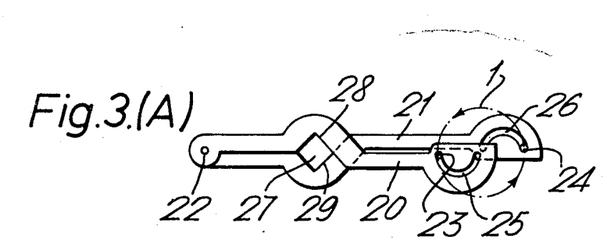

In FIG. 3, blades 20 and 21 each are held at one end by a common shaft 22. The blades 20 and 21 have cooperating concave portions 28 and 29, respectively, arranged such that the concave portion 28 and 29 define a light path 27 therebetween to allow the photographic light to pass through, and The aperture value decreases when the concave portion 28 and 29 are positioned closer to each other, and finally the light is intercepted when the blades 20 and 21 are positioned in the light path as shown in FIG. 3(B).

The opposite ends (i.e., the free ends) of the blades have curved grooves 25 and 26, respectively, within which grooves pins 23 and 24 are positioned in a manner so as to slide in the grooves. The pins 23 and 24 are fixed on a disc (not shown) which is secured to the shaft 6 of the stepping motor.

The operation of the blades is as follows: When the stepping motor rotates and the pins 23 and 24 move counterclockwise from the positions indicated in FIG. 3(A), the blades 20 and 21 are actuated relative to each other to narrow the light path 27, and finally the light path 27 is closed as shown in FIG. 3(B). However, when the stepping motor rotates to move the pins clockwise, the blades 20 and 21 move to open and widen the light path 27. The change of area of the light path 27 can be arbitrarily selected by suitably designing the shape of the curved grooves 25 and 26.

Figure 4:
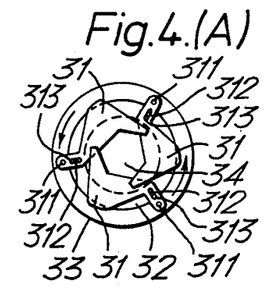
FIG. 4(A) is a front view of the construction of common blades in a second example of this invention.
FIG. 4(B) is an exploded perspective view of a stepping motor which may be used as an actuator of the device shown in FIG. 4(A)
FIG. 4(C) is an assembly formed by combining the parts shown in FIGS. 4(A) and (B)

A further blade embodiment is illustrated in FIGS. 4(A) to (C). Three blades 31 are rotatably held by respective shafts 311, to a ball bearing 33 as will be hereinafter described. A groove and 313 is provided in each blade within which pins 312, 312, project such that the pins can slide with respect to the grooves. Rotor 15 of the stepping motor has a central opening 151. The rotor is secured to the inner ring 32 of ball-bearing 33, and the stator of the stepping motor is secured to the outer ring 36 of the ball-bearing. The three shafts 311 are fixed to the outer ring 36, and the three pins 312 are fixed to the inner ring 32.

Therefore, the light path 34 defined by the three blades is changed by relative rotation of the inner ring 32 with respect to the outer ring 36. The light passes through the light path 34 and the opening 151 in the rotor 15.

Since shutter blades 31 are directly fixed to the stepping motor, this example has an advantage of compactness in size.

Figure 5:
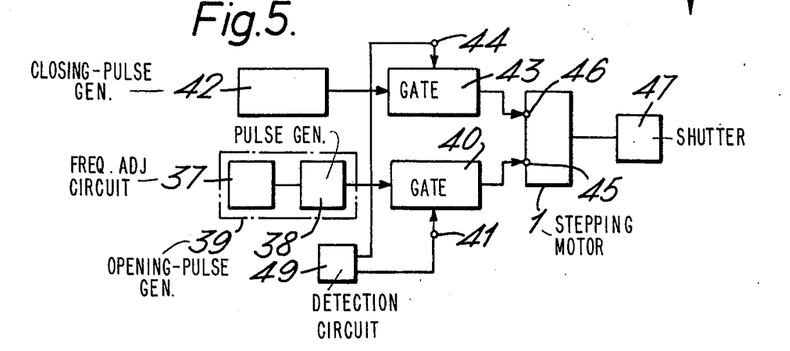
FIG. 5 is a block diagram of an electronic circuit for actuating the exposure-control mechanisms of the type shown in FIGS. 3 and 4.

FIG. 5 shows a block diagram of an electronic circuit for actuating the exposure-controlling mechanism illustrated in FIGS. 3(A), 3(B) and 4(A)-4(C). In FIG. 5, the stepping motor for actuating the blade-driving mechanism 47 is indicated as numeral 1. An opening-pulse generator 39 is provided for generating a pulse train to actuate the motor 1 so as to open the blades. The generator 39 comprising a known frequency adjusting circuit 37 and a known pulse generator 38, sends its output pulses through a gate circuit 40 to an input terminal 45 of the stepping motor 1 to actuate the shutter mechanism 47 to open the blades.

A circuit 49 detects brightness at the objective of the camera (not shown) and controls the gate circuit 40 in a manner such that the number of pulses passed by the gate circuit 40 corresponds to the objective brightness.

A closing-pulse generator 42 sends its output pulse train through a gate circuit 43 to the other input terminal 46 of the stepping motor 1 to actuate the shutter mechanism 47 to close the blades.

The input terminals 41 and 44 are for receiving control signals from the controlling circuit 49, so that the gate circuits 40 and 43 allow pulse trains to reach input terminals 45 and 46 respectively, of the stepping motor 1.

Figure 6:
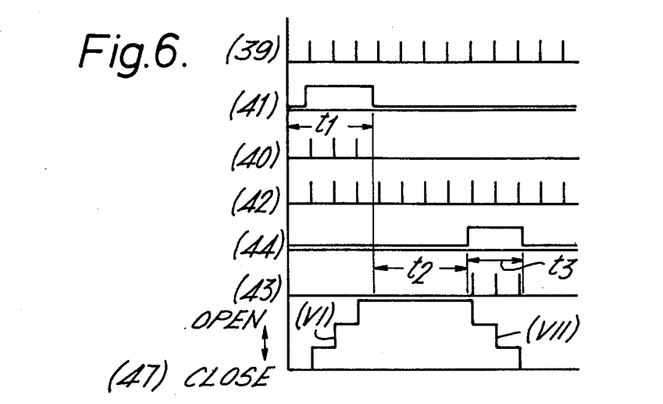
FIG. 6 is a time chart of signal waves in the principal circuits of the block diagram of FIG. 5 and a chart illustrating the exposure characteristic of the blades.

The operation of the circuit shown in FIG. 5 is illustrated in FIG. 6. The opening-pulse generator 39 produces a pulse train as shown by and the opening control signal with duty period of t1 as shown by (41) is fed through the terminal 41 to the gate circuit 40. Therefore, the gate circuit 40 passes output pulses, shown as (40), to the input terminal 45 of the stepping motor 1 thereby actuating the motor to step in a direction so as to open the blades, as shown by (47). The closing-pulse generator 42 produces a pulse train as shown by (42), and the closing-control signal with a duty period of t3, (which starts after a pause period of t2 from the termination of the opening control signal), is applied to the gate circuit 43. Therefore, the gate circuit 43 passes output pulses shown by (43) to the input terminal 46 of the stepping motor 1, actuating the motor 1 to rotate in the direction of closing the blades. Thus the shutter blades stepwise open, and then, after a preset exposure time, are stepwise closed as shown by FIG. 6 (47). In order to completely close the blades, the closing-control signal would have a duty period longer than that of the opening gate signal, so as to insure a greater angle of rotation of the stepping motor 1.

By varying frequency of the pulse train of the opening pulse generator 39 by adjusting its frequency adjusting circuit 37, the opening speed of the blades can be changed. Similarly, by providing a frequency adjusting circuit in the closing pulses likewise generator 42, frequency of the closing pulse can be adjusted.

In the abovementioned description, the example is so constituted that the opening pulses and the closing pulses are produced from different pulse generators and are passed through different gates, but in actual practice, by suitably switching input pulses to the stepping motor, the opening and closing operation of the motor is attainable with one pulse generator.

In the above-described arrangement, the aperture value is set by the duty period t1 of the opening control signal, and the exposure time is established by the pause period t2 lasting from the end of the opening control signal to the beginning of the closing control signal.

Figure 7:
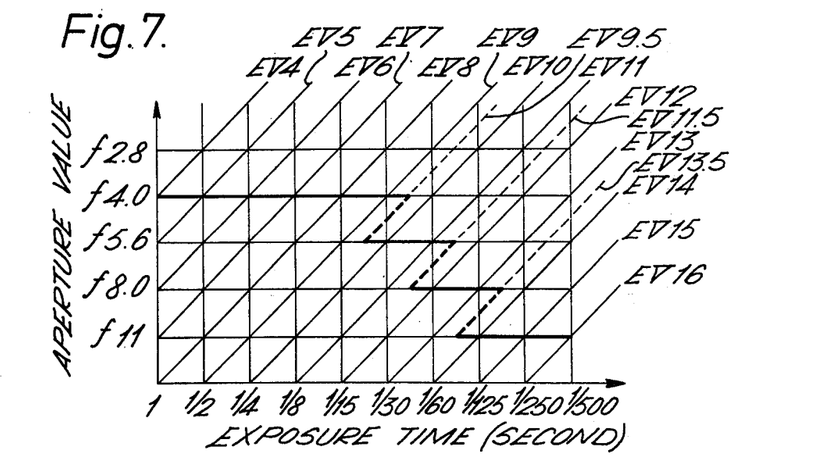
FIG. 7 is a typical program diagram of exposures for a programmed shutter according to this invention.

FIG. 7 is a chart showing an example of the relationships between exposure times (plotted along the abscissa), preset aperture values f (plotted along the ordinate) and exposure values Ev as parameters.

Assuming that the blade-actuating mechanism opens the blades in response to the actuating pulses in the following way:

by one opening pulse — the blades open to $f11$,
by two opening pulses — the blades open to $f8$,
by three opening pulses — the blades open to $f5.6$ and
by four opening pulses — the blades open to $f4$.

Suitable exposure characteristics are possible as now will be discussed.

As shown in FIG. 7, by suitably selecting the exposure time from 1 second to 1/500 second, the Ev values of from Ev4 to Ev16 are obtainable. In this programmed shutter system, suitable aperture values are preliminarily selected corresponding to Ev values. For example, in the program shown in FIG. 7, the aperture value is preset so as to be switched from $f11$ to $f8$ and vice versa at the Ev value of 13.5, from $f8$ to $f5.6$ and vice versa at the Ev value of 11.5, and from $f5.6$ to $f4$ and vice versa at the Ev value of 9.5.

Figure 8:
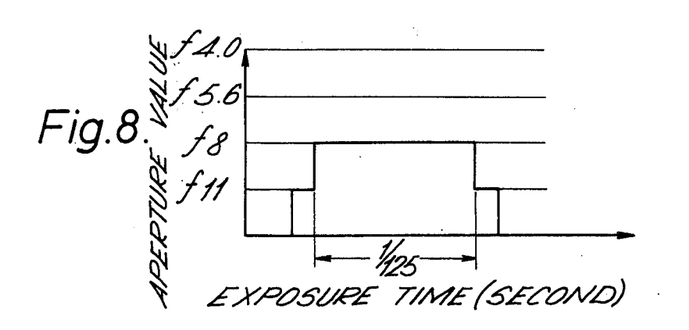
FIG. 8 is a chart showing an example of an exposure characteristic of a shutter operating according to the program diagram of FIG. 7.

Taking one example, for a brightness having an Ev value of 13, the aperture value is $f8$, and the exposure time, i.e., the shutter speed is 1/125 second. The exposure characteristic blades so operated is shown in the time chart designated FIG. 8.

Figures 9, 10:
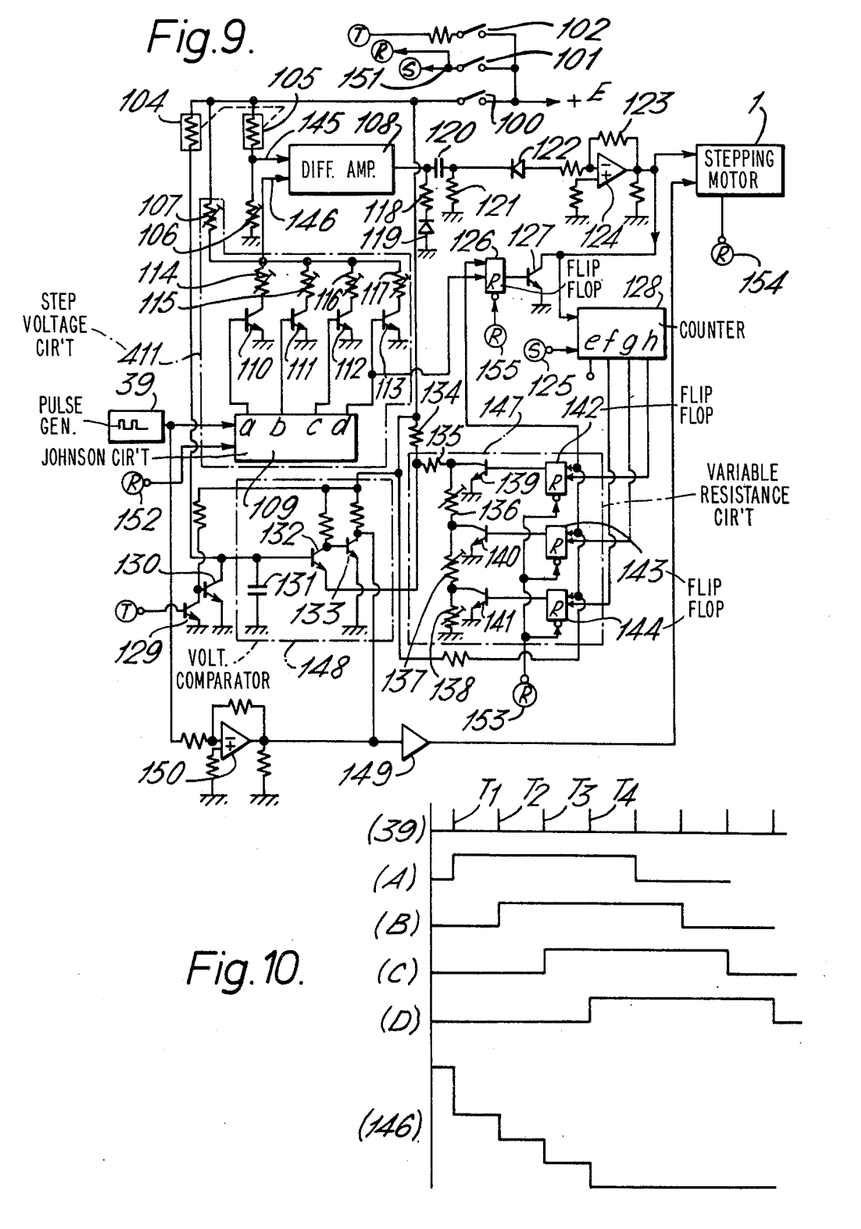
FIG. 9 is a circuit diagram showing an example of an electric circuit suitable for operation of the programmed shutter of this invention.
FIG. 10 is a time chart showing the performance of a Johnson circuit forming part of the electric circuit of FIG. 9.

FIG. 9 is a diagram of an actual example of a circuit suitable for carrying out the present invention.

A power switch 100 is interlocked with a shutter release button (not shown in the drawing) in such a manner as to be closed by pressing down the button for releasing the shutter. Upon closing the switch 100, the pulse generator 39 generates a pulse train as shown in FIG. 10 as (39), wherein the periods between pulses T1, T2, T3, T4 are, for instance, 2 milli seconds. The pulses are applied to a Johnson circuit (or a modified shift register circuit) 109, which puts out signals from its output terminals a, b, c and d as shown by waveforms (A), (B), (C) and (D) of FIG. 10. The bases of switching transistors 110, 111, 112 and 113 are connected to the terminals a, b, c and d, respectively, so that the transistors 110 to 113 are made conductive sequentially. The collectors of the transistors 110 to 113 are connected to the variable resistor 107, through resistors 114 to 117, respectively, thereby constituting a step voltage circuit 411. The output voltages of the circuit 411 can be adjusted in order to respond to change of lens or filter absorption, film sensitivity, etc., by adjusting the resistances of the resistors 107 and 114 to 117. The output voltage of the step voltage circuit 411 is applied to an input terminal 146 of a differential amplifier 108. The waveform of the step voltage signal applied to the input terminal 146 is shown in FIG. 10 as (146).

A photoconductive element 105 (for instance, a CdS element) and a semi-variable resistor 106 are connected in series across the D.C. power source (+E) and constitute a brightness detection circuit. The voltage dividing point, i.e., the output point of the brightness detection circuit, is connected to the other input terminal 145 of the differential amplifier 108 so that the input terminal 145 receives a voltage related to the brightness of the object.

When the objective brightness is high, the input terminal 145 receives a high voltage, and vice versa. Accordingly, in the differential amplifier 108, the input signal at the input terminal 145 is compared with the step voltage applied given to the input terminal 146, whereby the differential amplifier 108 produces a stepwise output signal responsive to the objective brightness.

Figures 11, 12:
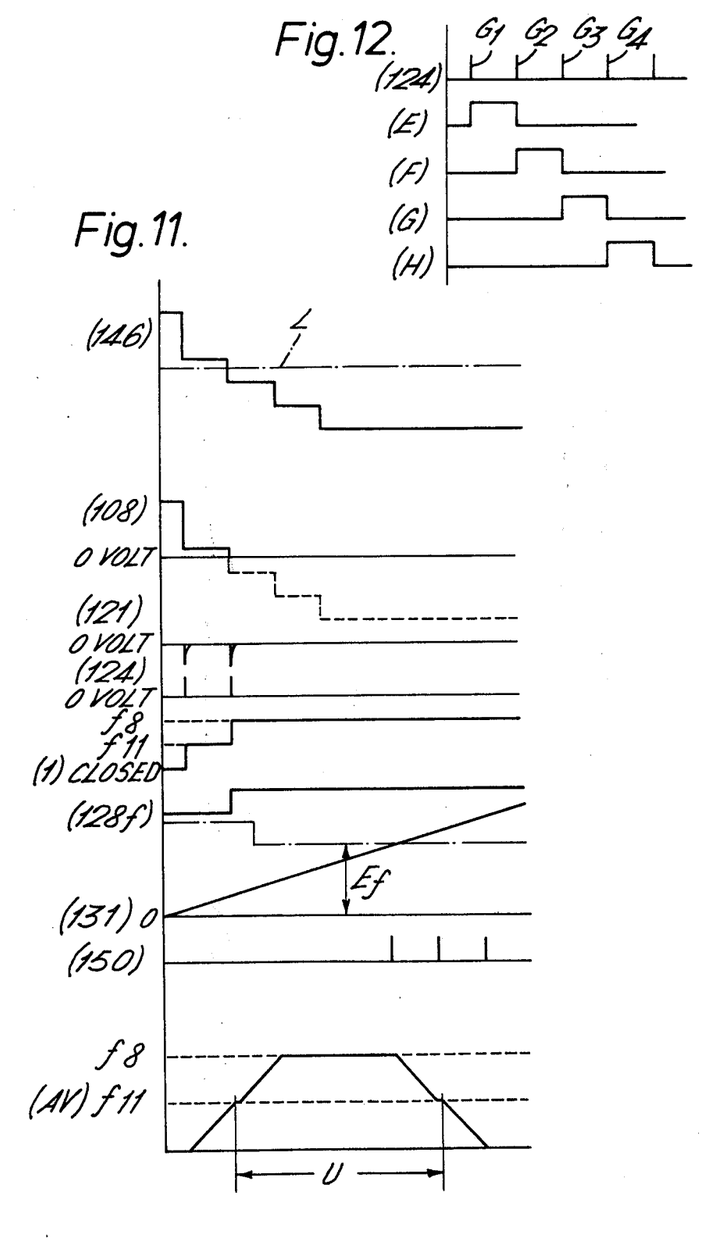
FIG. 11 is a time chart showing the performance of a ring counter circuit forming part of the electric circuit of FIG. 9.
FIG. 12 is a time chart showing the exposure characteristic of the programmed shutter according to this invention.

FIG. 11 shows one example of the abovementioned operation. Provided that the brightness signal level is as indicated by the line L shown in FIG. 11 as (146), the output signal of the differential amplifier 108 is produced as a step curve shown in FIG. 11 as (108). Then, by being rectified by the circuit consisting of a resistor 118 and a diode 119 at the output terminal of the differential amplifier 108, the negative part (dotted curve part) of the output step signal (108) is eliminated and the positive part (solid curve part) only is conveyed to the capacitor 120. The capacitor 120 and the resistor 121 constitute a differential circuit which differentiates the stepwise output signal to produce two pulses shown by FIG. 11 as (121). The output pulses are then applied, through a diode 122, to an operational amplifier 124 to form actuating pulses shown by FIG. 11 as (124). These pulses actuate the stepping motor 1 through two steps of rotation, and the blades are opened to f8 aperture as illustrated by FIG. 11 at (1).

Output terminal d of the Johnson circuit 109 is connected to a known JK-type flipflop circuit 126 the output of which is applied to the base of a switching transistor 127 for shortcircuiting the output of the operational amplifier 124. By providing such circuit elements as 126 and 127, once the Johnson circuit 109 completes one cycle operation upon putting out a signal from the terminal d, the transistor 127 shortcircuits the output circuit of the amplifier 124 so as to prevent transmission of unnecessary pulses thereafter.

As has been described above, the aperture value of the blades, i.e., Av value in APEX system, is automatically selected in response to the objective brightness. Then, under the selected aperture value, it is necessary to select appropriate exposure time.

As is known, in the APEX system (Additive System of Photographic Exposure) the following equation holds:

$$Ev = Av + Tv,$$

wherein
Ev — Exposure value
Av — Aperture value
Tv — Exposure time value (or Shutter speed value).

Therefore, in order to obtain a desired Ev value for the automatically preset value of Av, the Tv value must be automatically regulated to fulfil the abovementioned equation. Such automatic regulation is made in the following manner. A ring counter 128 receives the output signal of the operational amplifier 124 and sequentially puts out pulses at its output terminals $e, f, g$ and $h$. Provided that the operational amplifier 124 sends four pulses G1, G2, G3 and G4 to the stepping motor as well as to the ring counter 128 shown in FIG. 12 as (124), then the ring counter produces the four output signals E, F, G and H shown in FIG. 12 from the output terminals $e, f, g,$ and $h$, respectively. The output terminals $f, g,$ and $h$ are connected to input terminals of JK type flipflop circuits 144, 143 and 142, respectively, and output terminals of the JK type flipflop circuits 144, 143 and 142 are connected to the bases of the switching transistors 141, 140 and 139, respectively. Thus, the circuit 147 constitutes a variable resistance circuit, or a reference voltage circuit, wherein series connected resistors 136, 137 and 138 are shortcircuited one by one by the transistors 139, 140 and 141, so that the resistance of the circuit 147 changes stepwise in response to the number of opening pulses applied to the ring counter 128. The variable resistance circuit 147 and a resistor 134 connected to the power source +E form a voltage dividing circuit, the dividing point of which is connected to the emitter of a transistor 132. The base of the transistor 132 is connected to the connecting point between the series connection of a second photoconductive element 104 and a capacitor 131. The series connection of 104 and 131 forms a time constant circuit, and the transistor 132 compares the voltages of the dividing circuit and that of the time constant circuit. The transistor 133 is switched off when the voltage stored in the capacitor 131 exceeds the voltage of the dividing network. The collector and the emitter of a transistor 130 are connected to the ends of the capacitor 131 so as to shortcircuit the capacitor until a positive signal is applied, slightly after the shutter button is pressed, to the terminal T which is connected to the base of a transistor 129.

Thus, by the transistor 132, the charged voltage in the capacitor 131, which is responsive to the resistance of the photoresistive element 104, is compared with the divided voltage which is responsive to the number of opening pulses. As a result, the time the positive signal is impressed on the terminal T until the transistor 133 is switched off becomes dependent on the objective brightness detected by the element 104 and also on the value of aperture. The motion of the blades is shown by FIG. 11 as the (Av) curve, and the peak aperture value $f8$ is attained by two opening pulses. The effective exposure time is given by U in the curve.

The manner of automatic determination of the exposure time is as follows:

The ring counter 128 receives the pulses (124) of FIG. 11 which are the same as those applied to the stepping motor 1, and as a result the ring counter 128 produces the output signal (128f) of FIG. 11 at its output terminal $f$. This signal sets the JK type flipflop circuit 144, and the flipflop 144 memorizes the set state. Accordingly, the transistor 141 is made conductive and the conductive state is continued until resetting of the flipflop circuit 144. Consequently, the resistor 138 is shortcircuited by the transistor 141, and therefore, the dividing circuit comprising resistors 134 through 138 produces the following voltage Ef:

$$Ef = E \cdot \frac{r135 + r136 + r137}{r134 + r135 + r136 + r137},$$

wherein E is the power source voltage and $r134$ to $r137$ are the resistances of resistors 134 to 137, respectively. This voltage Ef is applied to the emitter of the transistor 132, and therefore, defines the switching level of a timer circuit which consists of the photoresistive element 104, capacitor 131 and the switching transistors 132 and 133. By the abovementioned operation, the emitter voltage Ef is set simultaneously with the opening of the blades, and thereafter the timer circuit begins to count the exposure time utilizing the voltage Ef as the reference voltage. The resistors 136 to 138 are variable resistors, so that, adjustments to respond to changes of the resistors 114 to 117 in the step voltage circuit 411, or changes of the characteristics of the sensors 104 or 105, are made thereby.

When the power switch 100 is closed by means of the interlocked with the shutter button, after a preset small delay period (for instance, 1/100 second or so,), a second switch 102 closes to give a positive signal through the terminal T to the transistor 129. Therefore, the capacitor 131 is released from being shortcircuited, and charging starts therein through the photoresistive element 104, as shown by the solid line (131) of FIG. 11. When the voltage of the capacitor exceeds the emitter voltage Ef of the transistor 132, the transistor 132 is turned on, and the transistor 133 is turned off. Therefore, the input terminal of the amplifier 149 is released from the mechanism, shortcircuited by the transistor 133, and pulses being from generator 39 pass through an operational amplifier 150 to form the closing pulse train. The pulses passing the amplifier 149 shown in FIG. 11 as (150), reach the stepping motor 1. Be being actuated by the closing pulses, the stepping motor 1 rotates in a direction opposite to that previously described and closes the blades.

As a result, the exposure time is substantially determined as the period from the opening of the blades, i.e., from the begining of the charging in the capacitor 131 to the turning-off of the transistor 133. The time chart of the change of aperture value is shown by FIG. 11 as (Av).

When the above operation of exposure is over at the completion of the closing of the blades, a reset switch 101 interlocked with the blades closes, and the positive voltage of source +E is applied through point 151 to the reset terminals 152, 153, 154, 155 and 125. Consequently the whole circuit is reset in preparation for the next cycle of operation.

In this invention, many steps of aperture values can be obtained by increasing the number of stages of the Johnson circuit 109 and the ring counter 128.

Also, by increasing the frequency of the pulse generator 39, the speeds of shutter opening and shutter closing can be increased, and sharp rise and fall of the aperture curve (AV) in FIG. 11 are obtainable.

In this invention, both the aperture value selections and the exposure time regulations are controlled by electronic circuitry, so that stepwise actuating means drive the blades, and therefore, complicated mechanical systems are eliminated.

Since the determination of the aperture value is made by the electronic system immediately before the opening of the blades, the aperture is appropriately obtained even for fast moving objects.

We claim:
1. A programmed shutter comprising:
   a plurality of blades adapted to serve both as shutter blades and as diaphragm blades;

a reversible stepping motor operatively connected to said blades to actuate same when the motor is energized, said stepping motor comprising first and second concentric rings rotatably related to one another and having a central opening through which light may pass, means for pivotally connecting said first ring to the blades, and means for slidably connecting the second ring to said blades whereby during relative rotation of the first and second rings the blades move with respect to one another to vary the amount of light passing through said opening;

gating means joined to said motor;

a pulse generator operatively connected to said gating means;

means responsive to brightness for controlling said gating means to develop a predetermined number of pulses at the output of the gating means to step the motor in one direction thereby opening the blades to an aperture value which is a function of the brightness; and means responsive to both the brightness and said aperture value for controlling said gating means, after a period of time which is a function of the brightness and aperture value, to apply pulses to the motor to step the motor in a reverse direction thereby closing the blades.

2. A programmed shutter comprising:

a plurality of blades adapted to serve both as shutter blades and as diaphragm blades;

a reversible stepping motor operatively connected to said blades to actuate same when the motor is energized;

gating means joined to said motor;

a pulse generator operatively connected to said gating means;

means responsive to brightness for controlling said gating means to develop a predetermined number of pulses at the output of the gating means to step the motor in one direction thereby opening the blades to an aperture value which is a function of the brightness, said gating means and the means responsive to brightness for controlling same comprising means, including a photosensitive device, for detecting brightness and producing a first voltage in response thereto, a circuit joined to said generator for registering pulses received from the generator, a step voltage circuit connected to the registering circuit for producing a stepwise-changing voltage as a function of the contents of the registering circuit, and a voltage comparison circuit joined to the photoconductive means and the step voltage circuit for comparing said first voltage and the stepwise-changing voltage in order to develop said predetermined number of pulses; and means responsive to both the brightness and said aperture value for controlling said gating means, after a period of time which is a function of the brightness and aperture value, to apply pulses to the motor to step the motor in a reverse direction thereby closing the blades.

3. A programmed shutter according to claim 2, wherein said step voltage circuit includes voltage adjusting means for varying said stepwise-changing voltage.

4. A programmed shutter according to claim 2, further comprising additional circuit means joined to said registering circuit and responsive to the contents thereof for preventing continuous cyclic development of said predetermined number of pulses at the output of the gating means.

5. A programmed shutter comprising:

a plurality of blades adapted to serve both as shutter blades and as diaphragm blades;

a reversible stepping motor operatively connected to said blades to actuate same when the motor is energized;

gating means joined to said motor;

a pulse generator operatively connected to said gating means;

means responsive to brightness for controlling said gating means to develop a predetermined number of pulses at the output of the gating means to step the motor in one direction thereby opening the blades to an aperture value which is a function of the brightness; and means responsive to both the brightness and said aperture value for controlling said gating means, after a period of time which is a function of the brightness and aperture value, to apply pulses to the motor to step the motor in a reverse direction thereby closing the blades, said means responsive to both brightness and said aperture value for controlling the gating means comprising a time constant circuit including an interconnected photosensitive device and integrating circuit for detecting brightness and producing a first voltage in response thereto, additional circuit means to which said predetermined number of pulses is joined for producing a reference voltage output therefrom which is a function of the number of said pulses, and voltage comparison means for comparing the first voltage and said reference voltage, said voltage comparison means being connected to the gating means.

6. A programmed shutter according to claim 5, wherein said additional circuit means for producing a reference voltage output includes means to adjust said output.

7. A programmed shutter comprising:

a plurality of blades adapted to serve both as shutter blades and as diaphragm blades;

a reversible stepping motor operatively connected to said blades to actuate same when the motor is energized;

a first gating means and a second gating means each joined to said motor;

a pulse generator operatively connected to said gating means;

a first controlling means responsive to brightness for controlling said first gating means to develop opening pulses, the number of which is a function of the brightness, at the output of the gating means to step the motor in one direction thereby opening the blades to an aperture value which is a function of the brightness; and a second controlling means responsive to both the brightness and said aperture value for controlling said second gating means, after a period of keep-blades-open time which time is a function of the brightness and aperture value, to apply closing pulses to the motor to step the motor in a reverse direction thereby closing the blades.

8. A programmed shutter according to claim 7, wherein said stepping motor comprises:

first and second concentric rings rotatably related to one another and having a central opening through which light may pass;

means for pivotally connecting said first ring to the blades; and means for slidably connecting the second ring to said blades whereby during relative rotation of the first and second rings, the blades move with respect to one another to vary the amount of light passing through said opening.

9. A programmed shutter according to claim 7, wherein first said gating means and the means responsive to brightness for controlling same comprise:

means including a photosensitive device for detecting brightness and producing a first voltage in response thereto;

a circuit joined to said generator for registering pulses received from the generator;

a step voltage circuit connected to the registering circuit for producing a stepwise-changing voltage as a function of the contents of the registering circuit; and a voltage comparison circuit joined to the photoconductive means and the step voltage circuit for comparing said first voltage and the stepwise-changing voltage in order to develop said predetermined number of pulses.

10. A programmed shutter according to claim 9, wherein said step voltage circuit includes voltage adjusting means for varying said stepwise-changing voltage.

11. A programmed shutter according to claim 9, further comprising additional circuit means joined to said registering circuit and responsive to the contents thereof for preventing continuous cyclic developemnt of said predetermined number of pulses at the output of the gating means.

12. A programmed shutter according to claim 7, wherein said means responsive to both brightness and said aperture value for controlling the second gating means comprises:

a time constant circuit including an interconnected photosensitive device and integrating circuit for detecting brightness and producing a first voltage in response thereto;

additional circuit means to which said predetermined number of pulses is joined for producing a reference voltage output therefrom which is a function of the number of said pulses; and voltage comparison means for comparing the first voltage and said reference voltage, said voltage comparison means being connected to the gating means.

13. A programmed shutter according to claim 12, wherein said additional circuit means for producing a reference voltage output includes means to adjust said output.

* * * * *